United States Patent [19]
Doversberger

[11] 3,957,313
[45] May 18, 1976

[54] PRESSURE INTENSIFIER UNIT FOR VEHICLE BRAKING SYSTEM

[75] Inventor: Richard A. Doversberger, Peoria, Ill.

[73] Assignee: Westinghouse Air Brake Company, Pittsburgh, Pa.

[22] Filed: June 16, 1975

[21] Appl. No.: 586,980

[52] U.S. Cl. .................................... 303/2; 92/168
[51] Int. Cl.² ........................................ B60T 13/10
[58] Field of Search ............ 92/168, 130 D; 60/547, 60/563, 593; 303/2, 1, 9, 13, 40, 68, 6 C, 6 R; 188/355, 358, 359

[56] References Cited
UNITED STATES PATENTS

| 3,183,671 | 5/1965 | Chowings | 303/2 X |
| 3,674,321 | 7/1972 | Fontaine | 303/2 X |
| 3,893,379 | 7/1975 | Cripe | 92/168 X |
| 3,905,651 | 9/1975 | Hornung | 303/2 |

Primary Examiner—Trygve M. Blix
Assistant Examiner—Douglas C. Butler
Attorney, Agent, or Firm—Wolfe, Hubbard, Leydig, Voit & Osann, Ltd.

[57] ABSTRACT

A pressure intensifier unit formed of a low pressure air cylinder and a high pressure hydraulic cylinder joined substantially end-to-end, with a large diameter air piston in the low pressure cylinder and a cylindrical piston, in the form of a straight-sided post, secured to the air piston and extending into the high pressure cylinder. An annular gland is provided at the junction between the cylinders for surrounding and sealing the cylindrical piston and for isolating the cylinders from one another. The inner diameter of the high pressure cylinder is greater than the diameter of the cylindrical piston so that, when the cylindrical piston moves into the high pressure cylinder upon application of air to the low pressure cylinder, clearance exists around the cylindrical piston, with hydraulic fluid being volumetrically displaced. The gland serves to mount a pair of axially spaced annular sealing elements with a replenishment port in between them connected to a source of replenishing fluid. The gland and the cylindrical piston are removable to permit substitution of a gland and cylindrical piston of different diameter to vary the intensification ratio.

9 Claims, 7 Drawing Figures

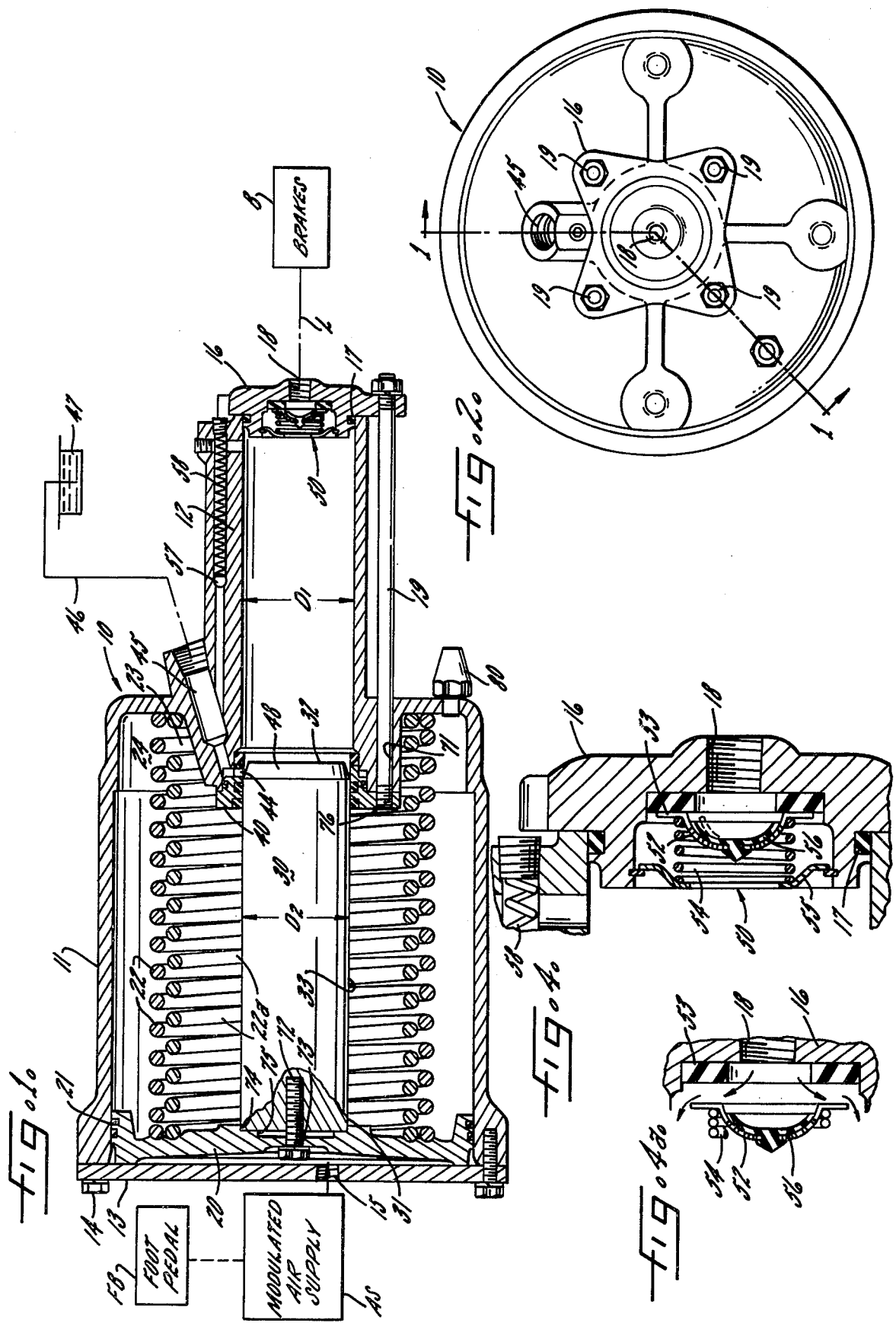

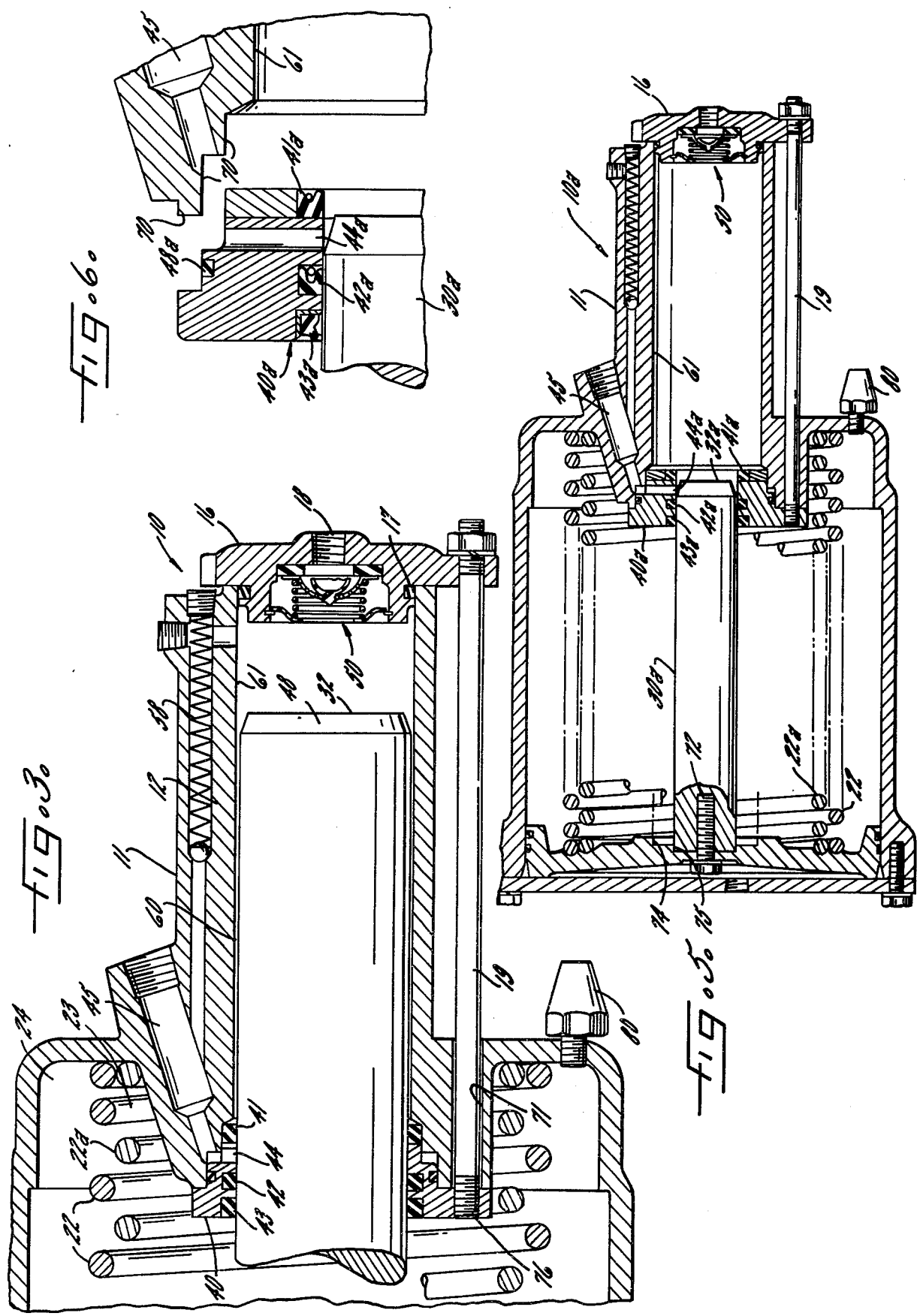

PRESSURE INTENSIFIER UNIT FOR VEHICLE BRAKING SYSTEM

BACKGROUND OF THE INVENTION

The invention relates generally to vehicle braking systems of the type having a control system in the form of an air supply modulated by the brake pedal for controlling an hydraulic braking system, with the two systems being coupled together by an intensifier in which an air pressure signal is converted into a higher hydraulic pressure in accordance with a predetermined intensification ratio.

A typical intensifier unit consists of a housing having a large low pressure cylinder with an air piston and a relatively small high pressure cylinder with an oil piston, the two pistons being connected together so that the hydraulic pressure at an outlet connection varies in accordance with the air pressure applied to an inlet connection. Prior devices have been relatively complicated and expensive requiring adherence to close tolerances and utilizing relatively complicated sealing and valving arrangements to isolate the two fluids. Prior intensifier units have, moreover, been limited to a single predetermined intensification ratio so that accommodating the needs of a wide range of vehicles has required a catalog series of units in incremental sizes. Moreover, prior devices have generally employed a moving seal carried by the high pressure piston, with replenishment of the hydraulic fluid, after the brakes are released, occurring via a series of small bleed holes which lie just ahead of such piston when the latter is in reference position. In such constructions it is necessary for the sealing element, carried by the piston, to traverse the bleed holes during each stroke. If the bleed holes are made of large diameter they affect the integrity of the surface and cause aggravated wear of the sealing element. On the other hand if the bleed holes are made of small diameter they restrict flow of the replenishing fluid, particularly at low temperatures, making it necessary to limit use to a fluid of low viscosity. Low viscosity fluids tend to exhibit high vapor pressures, thereby causing vapor pockets when the temperature subsequently rises causing the braking action to become "mushy" and creating a possibly hazardous condition. Moreover, use of small bleed openings invites clogging by any solid particles which may be carried by the hydraulic fluid particularly in the case of poorly maintained systems which have been operated for long periods of time.

In another popular design of intensifier there are no fixed bleed ports, as such, and replenishment occurs via special valving built into the hydraulic piston. Provision of such valving adds greatly to the expense and complexity and gives rise to service problems.

In conventional intensifiers, also, it has been the practice to use a short hydraulic piston connected to a relatively small diameter piston rod. As the piston moves forwardly, hydraulic fluid is sucked in to fill the annular void behind the piston and, upon the return stroke, such oil is expelled. This results in idle pumping of fluid in and out during each cycle resulting in unnecessary agitation of the fluid, possible cavitation with resultant leakage, and the risk of pumping harmful impurities into the unit at each stroke. For accommodating the fluid flowing back and forth a relatively large fluid reservoir must be employed and the line leading to the reservoir, as well as the fittings, must be of large size to handle a quantity of fluid many times greater than that required for make-up purposes in the brake system.

SUMMARY OF THE INVENTION

It is, accordingly, an object of the invention to provide an intensifier of simple and economical construction, which is highly reliable even in roughest usage, requiring a minimum of maintenance, which is versatile in application with a single size of unit accommodating a wide variety of braking systems and which overcomes the structural and operational disadvantages of prior intensifier units.

It is a more specific object to provide an intensifier unit which employs a high pressure hydraulic piston in the form of a straightsided post which is free of sealing rings or the like and in which cooperating annular sealing elements are, instead, stationarily mounted adjacent a stationary replenishment port, commonly referred to as bleed openings. Thus there is no possibility that a sealing element will be drawn across a bleed opening during the normal cycling of the device so that such openings may be made as large as desired, permitting free flow of hydraulic fluid regardless of viscosity and enabling prompt response free of any possibility of cavitation and resultant leakage. The high pressure piston is of extremely simple and inexpensive construction, being in the form of a monolithic straight cylindrical post unencumbered by seals or valves. Since the high pressure piston is the same diameter throughout its length, there is no piston rod as such and thus no provision need be made to replenish the void behind the piston as the piston moves back and forth. Thus the replenishment line and fittings leading to the reservoir are not called upon to accommodate flow of idle fluid and may be made just large enough to supply the small amount of fluid needed for make-up purposes.

It is another object of the present invention to provide a novel sealing gland for engaging a high pressure piston of post configuration, the gland including spaced annular sealing elements which are fixed in position, and which have a fixed replenishment port between them which is open to the high pressure cylinder when the piston occupies a reference position, the sealing element on the high pressure side being disengaged and in the relaxed state. It is a related object to provide an intensifier unit in which the sealing elements engage only a highly finished, continuous, and well lubricated surface, free of interruption by bleed openings or the like resulting in complete absence of wear. Because of this, and the fact that the seal on the high pressure side spends almost all of the time in a relaxed state, the seal life may be expected to outlast the vehicle in which the intensifier is used.

It is another object of the present invention to provide an intensifier which produces immediate and highly predictable response, with pressure build-up starting promptly upon slight movement of the piston, resulting in greatly improved overall response of the braking system from foot pedal to wheel cylinders.

In accordance with one of the important aspects of the present invention, the inner diameter of the high pressure cylinder is greater than the diameter of the cylindrical piston so that when the piston moves into the high pressure cylinder clearance exists around the cylindrical piston with the hydraulic fluid being forced into the brake solely by reason of volumetric displacement. Because of the annular clearance which exists around the high pressure piston, the inner wall of the high pressure cylinder need not be of precise diameter or precisely oriented and need not be highly finished resulting in economy of manufacture. Moreover, while the high pressure piston has an accurately predetermined diameter and a high surface finish, the piston need not be specially formed and may, indeed, be made of a simple cutoff length of chromium plated bar stock produced and sold in bulk for use in the hydraulic field and available in the market at low cost.

It is still another object of the present invention to provide an intensifier unit in which the gland and its cooperating high pressure piston are both removably clamped in position within the unit permitting replacement by gland-piston combinations having a wide range of diameter installed in the same housing to provide a wide range of intensification ratio, so that the same intensifier unit, with only minor modification, may be adapted to the needs of widely differing hydraulic braking systems over a wide range of vehicle size.

Other objects and advantages of the invention will become apparent upon reading the attached detailed description and upon reference to the drawings.

BRIEF DESCRIPTION OF THE DRAWINGS

FIG. 1 is an axial section taken through a pressure intensifier constructed in accordance with the invention and looking along line 1—1 in FIG. 2;

FIG. 2 is a right-hand end view of the intensifier;

FIG. 3 is a fragmentary axial section of the high pressure cylinder, similar to FIG. 1 but somewhat enlarged;

FIG. 4 is a fragmentary section showing the residual pressure checking device, FIG. 4a showing the same in unseated condition;

FIG. 5 is a section similar to FIG. 1 but showing substitution of a high pressure piston and gland of smaller diameter to increase the intensification ratio; and FIG. 6 is a fragmentary section showing the sealing rings in greater detail.

While the invention has been described in connection with a preferred embodiment, it will be understood that I do not intend to be limited to the particular embodiment shown but intend, on the contrary, to cover the various alternative and equivalent forms of the invention included within the spirit and scope of the appended claims.

Turning now to the drawings, the pressure intensifier unit has a cylindrical housing 10 which includes a low pressure cylinder II and a high pressure cylinder 12. The low pressure cylinder is enclosed by an end plate 13 secured in place by a ring of screws 14 and having a low pressure air inlet 15. The high pressure cylinder is enclosed by an end cap 16 having an O-ring seal 17 and high pressure outlet 18. The end cap is clamped in place by a set of four (see also FIG. 2) threaded, axially extending connecting rods 19.

Mounted for axial sliding movement within the low pressure cylinder 11 is a disc-shaped air piston 20 having anti-friction packing rings 21 and which is biased into the illustrated end, or reference, position by a return spring 22 which is of simple coil configuration. If desired, the spring may have a separate section 22a which is of slightly smaller diameter and coiled in the opposite direction.

The high pressure cylinder 12, while arranged coaxially end-to-end with respect to the low pressure cylinder, preferably overlaps the low pressure cylinder slightly, extending reentrantly into it as shown at 23 to define an annular end space 24 in which the return spring 22 is seated, and into which the spring is compressed when the piston moves to the right under the influence of applied air pressure.

In accordance with the present invention, a cylindrical high pressure piston is provided in the form of a smoothly-surface, straight-sided post coaxially secured at its base to the middle of the air piston and extending into the high pressure cylinder. Mounted at the junction between the high pressure cylinder and the low pressure cylinder, and surrounding the piston, is a stationary annular gland which mounts annular sealing elements in the form of resilient rings which seal against the smoothly finished outer surface of the high pressure piston and which serve to isolate the two cylinders from one another, the rings being provided in an axially spaced pair, with a replenishment port inbetween. The length of the high pressure piston is such that when the air piston is moved into its reference position by the return spring, the replenishment port is barely uncovered, for automatic addition of make-up fluid to the body of fluid in the high pressure cylinder.

Thus, referring to FIGS. 1 and 3 of the drawings, a high pressure piston 30 is provided having a base 31 and a tip 32 and which, unlike conventional pistons, is straight-sided, that is, of precisely constant diameter from tip to base. In other words, the high pressure piston 30 is in the form of a post having a straight axial side wall 33.

Cooperating with the high pressure piston 30 in an annular gland 40, the gland serving to mount a first sealing ring 41 on the high pressure side and second sealing ring 42 on the low pressure side. Supplementing the action of the sealing ring 42 is a scraper ring 43 which insures cleanliness of the piston as it enters the sealing area.

Arranged between the two sealing rings 41, 42 is a replenishment port 44 which communicates with a replenishment conduit 45 which is connected via a replenishment line 41 to a low pressure reservoir 47.

The high pressure piston 30, as stated, is so dimensioned that when it moves to its reference position it uncovers the replenishment port 43 illustrated in FIG. 1, thereby providing communication from the reservoir 47 to the high pressure cylinder for automatic flow of make-up fluid into the latter, to the extent necessary, each time that brake pressure is released. Since the tip 32 of the piston, in uncovering the replenishment port, must move clear of the high pressure sealing ring 41, the tip of the piston is smoothly chamfered as shown at 48 to provide gradual lead-in when the ring is reengaged by the piston. The high pressure ring, it may be noted, spends almost all of its life in the relaxed state so that it retains its full, liverly sealing capability almost indefinitely.

For conducting the pressurized fluid from the high pressure cylinder 12 via line L to the hydraulic brakes B, the fluid outlet connection 18 in end cap 16 has an associated residual pressure check device 50. The pressure check device, which insures that a certain minimum pressure will always be maintained in the brake line, is in the form of a concaved perforated disc 52 (see FIG. 4) which is biased against a sealing ring 53 by means of a coil spring 54 which is seated against an anchoring member 55, the perforations being normally covered, on the concave side, by a thin rubber disc 56. When fluid is expelled through the outlet 18, the disc mise the size of the replenishment port, such port may be made as large as desired to accommodate flow of brake fluid in viscous condition while avoiding any possibility of clogging by reason of foreign materials which may, in time, become entrained in the brake fluid. The sealing ring 42 and associated scraper-ring 43 hold the piston in a position to allow free flow of fluid around the seal with the piston in reference condition, thereby providing constant and effective lubrication for the seals and enabling pressure to be developed in the high pressure cylinder instantly upon movement of the high pressure piston.

In a typical sequence, pressing upon the foot pedal FP controls the modulated air supply AS so that pressurized air flows through the inlet 15 to move the air piston 20 to the right against the restoring force of the return spring 22. As the piston 30 begins to move, the replenishment opening 44 is immediately sealed off followed by sealing engagement between the high pressure sealing ring 41 and the chamfer 48. The sealing ring 41 is radially expanded to its sealing position on the outer surface 33 of the piston so that continued movement of the piston forces fluid under pressure through the pressure check device 50 and into the line L leading to the brakes. Because of the lack of contact of contact between the piston and cylinder wall, movement of the fluid and build-up of hydraulic pressure occur by reason of volumetric displacement.

A point is reached where the reaction pressure in the brake line and the resultant reaction force upon the high pressure piston, combined with the restoring force of the return spring, equals the force of the compressed air upon the air piston, so that equilibrium is achieved and no further piston movement takes place. When the operator subsequently removes his foot from the brake pedal, releasing the air pressure, the air piston and high pressure piston move to the left until bottoming takes place in the reference position. In this position the replenishment port 44 is barely uncovered, accompanied by disengagement of the high pressure sealing ring 41, so that any replenishment or make-up fluid is sucked from the reservoir putting the intensifier in immediate readiness for a subsequent power stroke.

It is apparent that the objectives of the invention have all been achieved: the device is not only simple and inexpensive to construct, but it is safe and reliable, being inherently maintenance-free over long periods of time, and highly versatile because of its conversion feature.

While the term "air piston" has been employed for the sake of convenience and easy understanding, it will be understood that this term is not intended to be limited to a piston of the sliding type, and the term is intended to include flexible diaphragms of the type commonly employed in pneumatic brakes and similar devices.

What is claimed is:

1. A pressure intensifier unit for a vehicle braking system having a modulated air supply and for controlling application of pressurized hydraulic fluid to a brake of the hydraulic type comprising, in combination, a cylindrical housing having a low pressure cylinder of large diameter and a high pressure cylinder of relatively small diameter joined coaxially end-to-end, a disc-shaped air piston and return spring therefor in the low pressure cylinder, a cylindrical high pressure piston of relatively small diameter in the form of a smoothly surfaced straight-sided post coaxially secured at its base to the air piston and extending into the high pressure cylinder, the high pressure cylinder being filled with hydraulic fluid, the low pressure cylinder having an air inlet for connection to the modulated air supply and the high pressure cylinder having an hydraulic fluid outlet for connection to the brake, an annular gland at the junction between the low pressure and high pressure cylinders, the gland mounting annular sealing elements for surrounding and sealing the cylindrical piston and for isolating the cylinders from one another, the inner diameter of the high pressure cylinder being greater than the diameter of the high pressure piston so that when such piston moves into high pressure cylinder upon application of air to the inlet annular clearance exists around the piston with the hydraulic fluid being volumetrically displaced for discharge at high pressure through the outlet.

2. The combination as claimed in claim 1 in which the annular gland as axially spaced sealing rings and in which the high pressure piston is formed of a length of smoothly finished cylindrical bar stock to cooperate with the sealing rings and in which the inner diameter of the high pressure cylinder which cooperates with the high pressure piston is unfinished and defines with the piston an annular clearance space.

3. A pressure intensifier unit for a vehicle braking system having a modulated air supply and for controlling application of pressurized hydraulic fluid to a brake of the hydraulic type comprising, in combination, a cylindrical housing having a low pressure cylinder of large diameter and a high pressure cylinder of relatively small diameter joined coaxially end-to-end, a disc-shaped air piston and return spring therefor in the low pressure cylinder, a cylindrical high pressure piston of relatively small diameter in the form of a smoothly surfaced straight-sided post coaxially secured at its base to the air piston and extending into the high pressure cylinder, the high pressure cylinder being filled with hydraulic fluid, the low pressure cylinder having an air inlet for connection to the modulated air supply and the high pressure cylinder having an hydraulic fluid outlet for connection to the brake, an annular seat at the junction between the two cylinders, an annular gland on the seat mounting annular sealing elements for surrounding and sealing the cylindrical piston and for isolating the cylinders from one another, the inner diameter of the high pressure cylinder being greater than the diameter of the high pressure piston so that when such piston moves into the high pressure cylinder upon application of air to the inlet annular clearance exists around the piston with the hydraulic fluid being volumetrically displaced for discharge at high pressure through the outlet, the annular gland having disengageable clamping means for clamping the same to the annular seat and the cylindrical piston having disengageable clamping means for securing the same to the air piston thereby to facilitate substitution of a gland and cooperating high pressure piston of different diameter for varying the intensification ratio, and means for adding make-up fluid to the high pressure cylinder.

4. The combination as claimed in claim 3 in which the high pressure cylinder has a removable end cap and in which axially extending threaded connecting rods are interposed between the end cap and the annular gland for clamping both of such members to the high pressure cylinder.

5. The combination as claimed in claim 3 in which a plurality of annular seats are provided at the center of yields so that the fluid can flow through the perforations. However, upon reverse flow of fluid back toward the intensifier, the rubber disc seals off the perforations and return movement of the fluid does not occur until the pressure exceeds a threshold level, normally on the order of five pounds per square inch, which unseats the disc 52 from the ring 53 as illustrated in FIG. 4*a*. This insures, in short, that a positive pressure will always exist in the brake line but, so as to avoid cavitation and possible leakage of air into the brake system, regardless of how suddenly the intensifier may be released. In order to prevent cavitation in the high pressure cylinder with possible inward leakage of air, an anticavitation check valve in the form of a ball 57 and spring 58 is interposed between the right-hand end of the high pressure cylinder and the conduit 45 which leads to the reservoir. Thus, any time that the pressure at the right-hand end of the piston drops below a predetermined level, which may be adjusted by the setting of the spring, the ball unseats, permitting direct inflow of fluid to make up the lack.

In accordance with one of the important features of the present invention, the inner diameter of the high pressure cylinder 12, and which is indicated at D1 exceeds the diameter of the high pressure piston 30, indicated at D2, so that the piston 30 is soley engaged by the sealing rings 41–43 and so that when the high pressure piston moves into the high pressure cylinder an annular clearance space, indicated at 60 in FIG. 3, exists around the high pressure piston, with the result that the hydraulic fluid is volumetrically displaced for discharge at high pressure through the outlet 50. Because of the lack of contact between the cylinder wall 61, and the outer surface 33 of the piston, the cylinder wall need not be accurately dimensioned, accurately oriented, or smoothly finished, thereby contributing to the economy of manufacture. The lack of contact between the cylinder wall 61 and the outer surface of the high pressure piston 30, and the fact that the high pressure piston is solely engaged by resilient sealing elements, which are constantly well lubricated by the hydraulic fluid, means that the device is substantially free of wear and may be operated over the life of the vehicle without necessity for replacement of the sealing rings or other component.

It is a still further feature of the present invention that the gland 40, instead of being integral, or permanently installed, is removably clamped against an annular seat at the inner end of the high pressure cylinder, and the high pressure piston 30, which cooperates with it, is removably secured to the air piston 20 so that a different gland-piston combination may be easily and quickly installed within the housing in order to provide a different intensification ratio as may be necessary to adapt the intensifier to a hydraulic system of different type or capacity (see FIGS. 5 and 6). The annular seat at the inner end of the high pressure cylinder, and which is indicated at 70, cooperates with mating seating surfaces on the gland. Thus, assuming that it is desired to raise the intensification ratio a high pressure piston in the form of a post 30*a* of smaller diameter than the piston 30 is provided having a cooperating gland 40*a* with a smaller diameter set of sealing rings 41*a*, 42*a*, 43*a* as well as an auxiliary outer sealing ring 48*a* which seals the gland with respect to the annular seat 70.

For removably clamping the gland 40, or the substitute gland 40*a* of smaller inner diameter, the threaded connecting rods 19 preferably extended through clearance openings 71 (FIG. 1) in the housing into registered engagement with threaded openings 76 (only one of which is shown) spaced about the periphery of the gland. The connecting rods 19 thus perform the double function of clamping both gland and end cap in seated positions at the respective ends of the cylinder.

For the purpose of substituting a piston 30*a* of narrow diameter for the piston 30 referred to above, a removable "clamp" is provided in the form of a machine screw 72 which engages an opening 73 at the middle of the air piston 20. In order to insure that the pistons 30, 30*a* are coaxially mounted, the air piston 20 is provided with respective concentric seats 74, 75.

FIGS. 1 and 5 illustrate two of the possible diameters of high pressure piston, and since volumetric displacement is utilized to produce pressurization of the fluid, no corresponding change need be made in the diameter of the high pressure cylinder. Indeed, it will be apparent that a wide range of diameter of high pressure piston and cooperating gland may be employed, beyond the two sizes shown, to achieve a correspondingly wide range of intensification ratio. Thus it is possible for a single size of housing to accommodate braking systems in a wide variety of sizes and types of vehicles. Since any post and gland combination, tailored to the need, can be easily installed in the same housing, there is no need to maintain a large inventory of housings. Moreover, the easy replaceability of posts and glands enables easy maintenance and renewal in the event that servicing is required.

While it is necessary for the low pressure cylinder 11 to "breathe" as the air piston 20 moves back and forth, the atmosphere within the low pressure cylinder is constantly kept free of dirt or abrasive particles by means of a filter 80. Since the outflow of air through the filter occurs more rapidly than inflow, the pores of the filter are constantly self-cleaned.

One of the economical features of the present construction is that the high pressure piston 30, and its smaller diameter counterpart 30*a*, are free of valves, machined grooves or other complications and may be formed by cutting off lengths of standard chromed cylindrical stock available in bulk as a catalog item. Aside from cutting to length, all that is required is to chamfer one end and thread the other.

Because of the post-type construction and constant diameter of the high pressure piston 30, the only fluid which need be accommodated through replenishment port 44 and its conduit 44 is the small amount required for make-up. This is to be contrasted with conventional intensifiers employing conventional pistons with piston rods, creating a void behind the piston into which fluid must flow, and be expelled, during each cycle of piston movement. Such flow, occurring at a high volumetric rate, is idle and unproductive, requiring relatively large fittings and lines for accommodation and raising the likelihood that, by reason of the turbulent pumping, impurities will be drawn into the intensifier to cause wear and maintenance problems. The pumping also raises the likelihood of cavitation on the suction stroke and hence the leakage of air into the fluid, capable of degrading the performance of the brakes to create a hazard.

Since the stationary sealing rings 41–43 engage only a smoothly finished, chromed surface on the piston 30, and need not be dragged across bleed or replenishment ports as in more conventional constructions, long seal life is assured and, since it is not necessary to comprothe air piston for coaxial seating of a plurality of high pressure pistons of corresponding diameter, the air piston having a central opening for accommodating a clamping screw for threaded engagement of the presented end of the high pressure piston.

6. A pressure intensifier unit for a vehicle braking system having a modulated air supply and for controlling application of pressurized hydraulic fluid to a brake of the hydraulic type comprising, in combination, a cylindrical housing having a low pressure cylinder of large diameter and a high pressure cylinder of relatively small diameter joined coaxially end-to-end, a disc-shaped air piston in the low pressure cylinder having a return spring for returning it to a reference position, a cylindrical high pressure piston of relatively small diameter in the form of a smoothly surfaced straight-sided post coaxially secured at its base to the air piston and extending into the high pressure cylinder, the high pressure cylinder being filled with hydraulic fluid, the low pressure cylinder having an air inlet for connection to the modulated air supply and the high pressure cylinder having an hydraulic fluid outlet for connection to the brake, an annular gland at the junction between the low pressure and high pressure cylinders for surrounding and sealing the cylindrical piston and for isolating the cylinders from one another, the inner diameter of the high pressure cylinder being greater than the diameter of the high pressure piston so that when such piston moves into the high pressure cylinder upon application of air to the inlet, annular clearance exists around the cylindrical piston with the hydraulic fluid being volumetrically displaced for discharge at high pressure through the outlet, and annular gland having axially spaced sealing rings and having a replenishment port positioned between the sealing rings, the port having provision for connection to a reservoir of hydraulic fluid, the high pressure piston being of such length as to barely uncover the port when the air piston is returned to reference position by the return spring for automatic addition of make-up fluid to the body of fluid in the high pressure cylinder.

7. The combination as claimed in claim 6 in which the tip of the cylindrical piston is chamfered to provide lead-in with respect to the annular sealing element which is adjacent the high pressure cylinder.

8. A pressure intensifier unit for a vehicle braking system having a modulated air supply and for controlling application of pressurized hydraulic fluid to a brake of the hydraulic type comprising, in combination, a cylindrical housing having a low pressure cylinder of large diameter and a high pressure cylinder of relatively smaller diameter, the cylinders being coxial with the high pressure cylinder projecting reentrantly into the end of the low pressure cylinder to define an annular end space within the low pressure cylinder, a disc-shaped air piston and return spring therefor in the low pressure cylinder, the return spring being seated in the annular end space for biasing the air piston to a reference position, a high pressure cylindrical piston of relatively small diameter in the form of a smoothly surfaced straight-sided post coaxially secured at its base to the air piston and extending into the high pressure cylinder, the high pressure cylinder being filled with hydraulic fluid, the low pressure cylinder having an air inlet for connection to the modulated air supply and the high pressure cylinder having an hydraulic fluid outlet for connection to the brake, an annular seat at the inner end of the high pressure cylinder, an annular gland mounted on the seat for surrounding and sealing the high pressure piston and for isolating the cylinders from one another, the annular gland having a pair of spaced sealing rings and having a replenishment port therebetween, the replenishment port having provision for connection to a reservoir of hydraulic fluid, the high pressure piston being of such length as to barely uncover the replenishment port when the air piston is returned to reference position by the return spring for automatic make-up of fluid to the body of fluid in the high pressure cylinder, the diameter of the high pressure cylinder being greater than the diameter of the sealing rings so that the high pressure piston is engaged solely by the sealing rings.

9. A pressure intensifier unit for a vehicle braking system having a modulated air supply and for controlling application of pressurized hydraulic fluid to a brake of the hydraulic type comprising, in combination, a cylindrical housing having a low pressure cylinder of large diameter and a high pressure cylinder of relatively smaller diameter joined coaxially end-to-end, a disc-shaped air piston in the low pressure cylinder having a return spring for returning the piston to a reference position, a cylindrical high pressure piston of relatively small diameter in the form of a straight-sided post coaxially secured at its base to the air piston and extending into the high pressure cylinder, the high pressure cylinder being filled with hydraulic fluid, the low pressure cylinder having an air inlet for connection to the modulated air supply and the high pressure cylinder having an hydraulic fluid outlet for connection to the brake, an annular seat at the inner end of the high pressure cylinder, an annular gland mounted on the seat for surrounding and sealing the high pressure piston and for isolating the cylinders from one another, the annular gland having a pair of spaced sealing rings and having a replenishment port therebetween, a replenishment conduit at the junction of the cylinders having provision for connection to a reservoir of hydraulic fluid and leading to the seat, the cylindrical piston being of such length as to barely uncover the port when the air piston is returned to reference position by the return spring for automatic make-up of fluid to the body of fluid in the high pressure cylinder, means including removable clamping screws for securing the gland to the seat and for securing the high pressure piston to the air piston thereby to facilitate replacement of the gland and high pressure piston by cooperating ones of different diameter with automatic establishment of a connection between the replenishment port and replenishment conduit.

* * * * *